(12) United States Patent
Sadeghian Marnani (10) Patent No.: US 8,914,910 B1
(45) Date of Patent: Dec. 16, 2014

(54) PROBE CALIBRATION

(71) Applicant: Nederlandse Organisatie voor toegepast-natuurwetenschappelijk onderzoek TNO, Delft (NL)

(72) Inventor: Hamed Sadeghian Marnani, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 0 days.

(21) Appl. No.: 14/374,740

(22) PCT Filed: Dec. 21, 2012

(86) PCT No.: PCT/NL2012/050916
§ 371 (c)(1),
(2), (4) Date: Jul. 25, 2014

(87) PCT Pub. No.: WO2013/115638
PCT Pub. Date: Aug. 8, 2013

(30) Foreign Application Priority Data

Jan. 30, 2012 (EP) .................................... 12153148

(51) Int. Cl.
*G01Q 40/00* (2010.01)

(52) U.S. Cl.
CPC ...................................... *G01Q 40/00* (2013.01)
USPC ..................... 850/19; 850/20; 850/62; 850/63

(58) Field of Classification Search
CPC ....... G01Q 10/00; G01Q 10/02; G01Q 10/04; G01Q 10/045; G01Q 10/06; G01Q 10/065; G01Q 20/00; G01Q 20/02; G01Q 20/04; G01Q 40/00; G01Q 40/02; G01Q 80/00; G01Q 90/00
USPC .............. 850/1, 2, 3, 4, 5, 6, 7, 19, 20, 62, 63
See application file for complete search history.

(56) References Cited

U.S. PATENT DOCUMENTS

2008/0249737 A1* 10/2008 Jordil et al. .................... 702/152
2009/0248345 A1* 10/2009 Jonas et al. ..................... 702/94

(Continued)

FOREIGN PATENT DOCUMENTS

| FR | 2887986 | 1/2007 |
|----|---------|--------|
| JP | 1194859 | 4/1999 |
| WO | 2004112050 | 12/2004 |
| WO | 2005098869 | 10/2005 |

OTHER PUBLICATIONS

Scholl et al., "In situ force calibration of high force constant atomic force microscope cantilevers," Review of Scientific Instruments, pp. 2255-2257, 65 (1994) July, No. 7, 1994.

(Continued)

*Primary Examiner* — Nicole Ippolito
(74) *Attorney, Agent, or Firm* — Hoffmann & Baron, LLP (57) ABSTRACT

The arrangement for calibrating probes comprises a source (10) of coherent photon radiation and at least one optically based strain sensor (12a) for measuring an amount of strain ($\epsilon$). The at least one optically based strain sensor is optically coupled to said source of coherent photon radiation. The arrangement further comprises at least one calibration lever (14) having a surface for placement of a tip (21) of a probe (2) to be calibrated, and that is mechanically coupled to the at least one optically based strain sensor for converting a force (F) exerted by said tip at said surface into an amount of strain in the optically based strain sensor. The arrangement further comprises at least one probe holder (24) for holding the probe (2) to be calibrated, the at least one probe holder having a controllable position in at least a direction (y) transverse to the surface of the calibration lever (14). The arrangement further comprises a calibration control facility (46) for controlling said controllable position within a range of position values, and for determining a mechanical property of said probe from the measured amount of strain ($\epsilon$) and a deflection ($\delta_C$) of the tip (21) of the probe relative to the probe holder as a function of said position.

The arrangement may be used as a stand-alone device or may be integrated in a device, such as an AFM-device. The arrangement may also be carried out as a batch-calibration device.

16 Claims, 10 Drawing Sheets

(56) References Cited

U.S. PATENT DOCUMENTS

2010/0071098 A1* 3/2010 Mirkin et al. .................. 850/21
2011/0041224 A1 2/2011 Raman et al.
2011/0176763 A1 7/2011 Wong et al.

OTHER PUBLICATIONS

Torii et al., "A method for determining the spring constant of cantilevers for atomic force microscopy," Meas. Sci. Technol. 7, pp. 179-184, 1996.

Cumpson et al., "Accurate analytical measurements in the atomic force microscope: a microfabricated spring constant standard potentially traceable to the SI," Institute of Physics Publishing, Nanotechnology 14, pp. 1279-1288, 2003.

Langlois et al., "Spring constant calibration of atomic force microscopy cantilevers with piezosensor transfer standard," Review of Scientific Instruments 78, 2007.

Chung et al., "SI traceable calibration of an instrumented indentation sensor spring constant using electrostatic force," Review of Scientific Instruments 79, 2008.

* cited by examiner

PROBE CALIBRATION

This application is the U.S. National Phase of, and Applicant claims priority from, International Patent Application Number PCT/NL2012/0508916 filed 21 Dec. 2012, which claims priority from EP12153148.7 filed 30 Jan. 2012, each of which is incorporated herein by reference.

BACKGROUND OF THE INVENTION

1. Field of the Invention

The present invention relates to an arrangement for calibrating probes such as AFM probes.

The present invention further relates to an atomic force microscope including such an arrangement.

The present invention further relates to a batch calibration device for calibrating a batch of probes, such as a batch of AFM-probes.

The present invention further relates to a method for calibrating AFM probes.

2. Related Art

Atomic force microscopes AFMs are widely used for the physical characterization of materials and devices when high spatial resolution and small feature sizes are of interest. AFMs are primarily used in imaging modes to provide topographic information, but they can also record the force interaction between the cantilever sensor tip and a sample.

Measuring the force interaction between the tip and surface involves measuring the deflection of a spring suspension. In the case of an AFM, the force sensor itself is a microfabricated cantilever that functions as a passive mechanical sensor. Users interested in small force measurements must therefore determine the suspension spring constant, or otherwise calibrate this deflection as a force.

Process non-uniformities and variations during fabrication of the cantilever, contaminations and imperfections lead to uncertainties in cantilever's spring constant. Therefore, a calibration of the AFMC is essential to enable reliable measurements. Similar probes are used in other instruments, such as indentation machines. Various calibration methods are known. For example FR 2887986 A1 discloses a method that involves placing an oscillator e.g. lever, in contact with a deformable object, where the oscillator has a resonance frequency, a mass and a stiffness. The oscillator is oscillated at its resonance frequency. A resonance frequency of the oscillator contacting the object is measured by determining a resonance curve of the oscillator by a synchronous detection, or by measuring an instantaneous resonance frequency of the oscillator between a position of non-contact of the oscillator with the object and a position of contact of the oscillator with the object. Another method is disclosed in SCHOLL D ET AL: "In Situ Force Calibration of High Force Constant Atomic Force Microscope Cantilevers", REVIEW OF SCIENTIFIC INSTRUMENTS, AIP, MELVILLE, NY, US, vol. 65, no. 7, 1 Jul. 1994 (19940701), pages 2255-2257

A further method is disclosed in AKIHIRO TORII ET AL: "A method for determining the spring constant of cantilevers for atomic force microscopy", MEASUREMENT SCIENCE AND TECHNOLOGY, BRISTOL, GB, vol. 7, no. 2, 1 Feb. 1996 (1996-02-01), pages 179-184. Therein the spring constant of an atomic force microscope (AFM) cantilever is measured by using a calibration lever formed by a large-scale cantilever. The spring constant of the AFM cantilever is determined by varying a displacement of a stage carrying large-scale cantilever and measuring the deflections of both cantilevers simultaneously using heterodyne interferometry. The spring constant of the AFM cantilever is determined from the slope of the measured deflection as a function of the stage displacement. The calibration lever is a large-scale cantilever, i.e. in the order of a centimeter long. The spring constant of the large-scale cantilever is determined by measuring both its deflection and the mass of a weight attached at the end of the large-scale cantilever. However, due to the large scale of the calibration lever the range in which the spring constant can be reliably measured is limited.

SUMMARY OF THE INVENTION

It is an object of the present invention to provide an improved calibration arrangement with a calibration lever for calibrating probes with a tip.

According to a first aspect of the invention an arrangement for calibrating probes with a tip, such as AFM probes is provided, the arrangement comprising at least one calibration lever having a surface for placement of a tip of a probe to be calibrated, at least one probe holder for holding the probe to be calibrated, the at least one probe holder having a controllable position in at least a direction transverse to the surface of the calibration lever, a calibration control facility for controlling said controllable position within a range of position values, and for determining a mechanical property of said probe from a deflection of the tip of the probe relative to the probe holder as a function of said position and from a second parameter, characterized in that the arrangement further comprises at least one optically based strain sensor for measuring an amount of strain that is optically coupled to a source of coherent photon radiation, the calibration lever being mechanically coupled to the at least one optically based strain sensor for converting a force exerted by said tip at said surface into an amount of strain in the optically based strain sensor, and wherein the second parameter for determining a mechanical property of said probe is the measured amount of strain.

An optically based strain sensor is defined here as a sensor that determines a length or length variation in relation to a known wavelength of the radiation of the source of coherent photon radiation. Optically based strain sensor include but are not limited to nanophotonics sensors such as waveguide-based, monolithically integrated resonant interferometers, such as Bragg-grating-based Fabry-Perot resonators, microspheres, microdisks, microtoroids, photonic crystal cavities and ring resonators.

According to the present invention the force exerted by said tip at said surface is converted into an amount of strain in the optically based strain sensor. A high linearity can be achieved between the strain and the force exerted by the tip for a large dynamic range of the force, and in addition the optically based sensor has a highly linear response to variations in the dynamic strain over a large dynamic range thereof. The method is also suitable for application to relatively small sized calibration levers as it is not necessary to use weights attached at the end of the calibration lever to determine its spring constant. Instead, for this purpose forces may be applied by electrostatic or magnetic means. The arrangement therewith offers a reliable calibration of the probe.

According to a second aspect of the invention an atomic force microscope is provided that includes an arrangement as described above.

According to a third aspect of the invention a batch calibration device is provided for calibrating a batch of probes. In the batch calibration device the at least one optically based strain sensor is one of a plurality of optically based strain sensors, and the at least one calibration lever is one of a plurality of calibration levers. Each calibration lever is mechanically coupled to a respective one of the plurality of optically based strain sensors for converting a force exerted by said tip at said surface into an amount of strain in the respective optically based strain sensor. The batch calibration device further comprises an optical splitter having an input coupled to the source of coherent photon radiation and a plurality of outputs, wherein each of said plurality of optically based strain sensors is coupled to the source of coherent photon radiation via a respective one of the plurality of outputs of the optical splitter. In practice probes in an array will have a strong variation in spring constant due to their variation in geometry.

The batch calibration device provides for a fast and simple method capable of batch calibration of such an array at the manufacturer's side, satisfying both the user and the manufacturer's interests. CMOS compatible fabrication processes allow for integration of thousands of such optically based strain sensors. This enables parallel calibration of arrays of probes. Since the frequency range of an optically based strain sensor in particular that of a micro-ring resonator is very wide (up to Giga Hertz) these sensors are extremely suitable as there large sensitivity range allows calibration of a batch of probes having substantial variation in geometry and corresponding variation in spring constant and consequently different resonance frequency.

According to a fourth aspect of the invention a method is provided for calibrating probes comprising a tip wherein the method according to the fourth aspect comprises the steps of
a. generating coherent photon radiation,
b. providing at least one optically based strain sensor for measuring an amount of strain,
c. optically coupling said at least one optically based strain sensor to said source of coherent photon radiation,
d. providing at least one calibration lever having a surface for placement of a tip of a probe to be calibrated,
e. mechanically coupling the at least one calibration lever to the at least one optically based strain sensor,
f. varying a position of the probe at an end remote from the tip in a direction transverse to said surface, the tip of the probe therewith exerting a variable force to said surface, said force (F) being converted into an amount of strain in the optically based strain sensor by said mechanical coupling,
g. measuring said force by the conversion thereof into a strain, causing said strain to modulate a property of said generated coherent photon radiation with said optically based strain sensor and determining the strain from said modulation in said property,
h. determining a mechanical property of said probe from the determined amount of strain and a deflection of the tip of the probe relative to said remote end as a function of said position in the transverse direction.

BRIEF DESCRIPTION OF THE DRAWINGS

These and other aspects are described in more detail with reference to the drawing. Therein:

FIG. 1A shows an alternative for this arrangement, FIG. 2 schematically shows a response of a sensor used in the arrangement of FIG. 1 or 1A, FIGS. 5, 5A and 5B shows part of these embodiments in more detail, therein FIG. 5B is a top-view according to VB in FIG. 5A, with hidden objects indicated by dashed lines, FIG. 10A illustrates a relation between variables relevant to the method, FIGS. 11A and 11C further illustrates a step of the method.

DETAILED DESCRIPTION OF EMBODIMENTS

Like reference symbols in the various drawings indicate like elements unless otherwise indicated.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Figure 1:
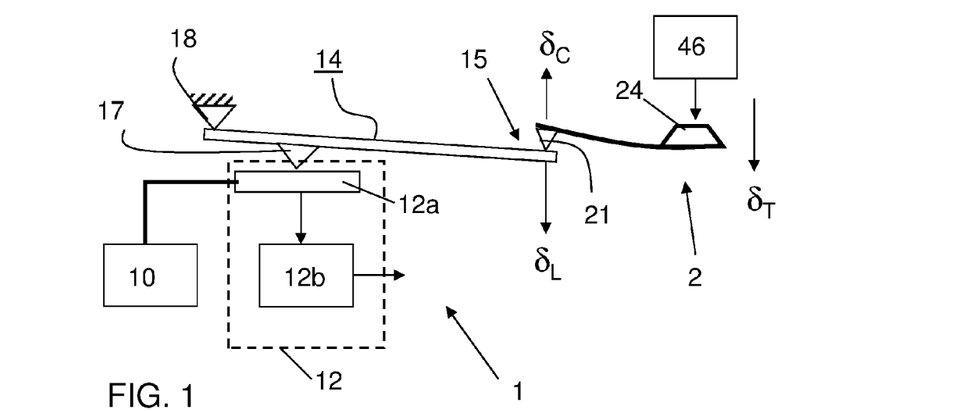
FIG. 1 shows a first embodiment of an arrangement of the first aspect of the invention.

FIG. 1 schematically shows an arrangement 1 according to a first embodiment of the invention for calibrating probes 2. The arrangement comprises a source 10 of coherent photon radiation with wavelength $\lambda_S$, such as a lensed fiber laser diode, a grating coupled laser diode or an invert tapered laser diode. The arrangement further comprises a sense unit 12 including an optically based strain sensor 12a for measuring an amount of strains. The optically based strain sensor has an optical property dependent on an amount of strain. The sense unit 12 further has a read-out unit (also denoted as interrogator) 12b for generating an electric signal indicative of said dependent optical property. The sense unit 12 is coupled to the source of coherent photon radiation.

The arrangement further comprises a calibration lever 14 having a surface 15 for placement of a tip 21 of a probe 2 to be calibrated. The calibration lever 14 is mechanically coupled to the sense unit 12 for converting a force exerted by said tip 21 at said surface into an amount of strain in the sense unit 12. In the embodiment shown the calibration lever 14 has an anchor point 18, as well as a contact point 17 that induces the strain in the optically based strain sensor 12a of the sense unit 12.

The arrangement further comprises a probe holder 24 for holding the probe 2 to be calibrated. The probe holder 24 has a controllable position in at least a direction y transverse to the surface of the calibration lever 14.

The arrangement further comprises a calibration control facility 46 for controlling said controllable position within a range of position values. The calibration control facility 46 is further arranged for determining a mechanical property of said probe 2 from the measured amount of strain $\epsilon$ and a deflection $\delta_C$ of the tip 21 of the probe relative to the probe holder as a function of said position. The measure amount of strain is indicative for the force exerted by the probe to be calibrated. Subsequently the mechanical property, e.g. the spring constant K of the probe's cantilever can be determined from the relation between the force so determined and the deflection of the probe determined for a range of position values.

Figures 1A, 2:
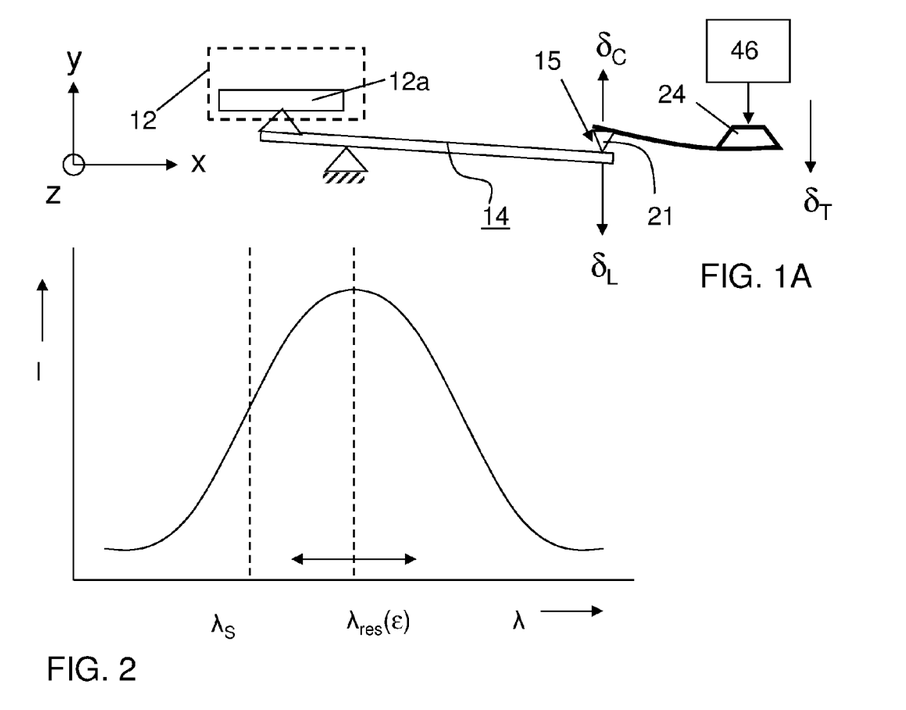

FIG. 1A shows a further arrangement, wherein the positions of the contact point 17 and the anchor point 18 are mutually exchanged.

In an embodiment the optically based strain sensor 12a is a ring resonator and the interrogator is an opto-electric converter 12b such as a photo-voltaic device that provides an output signal indicative for an intensity I of the photon radiation at the output of the ring resonator. However, another device may be used as the optically based strain sensor 12a, such as a fiber based grating (FBG). The ring resonator has a waveguide with a resonance wavelength $\lambda_{res}$ that is dependent on the amount of strain $\epsilon$ in the sensor. Accordingly the intensity I measured is indicative for the amount of strain measured, as indicated in FIG. 2.

Figure 3:
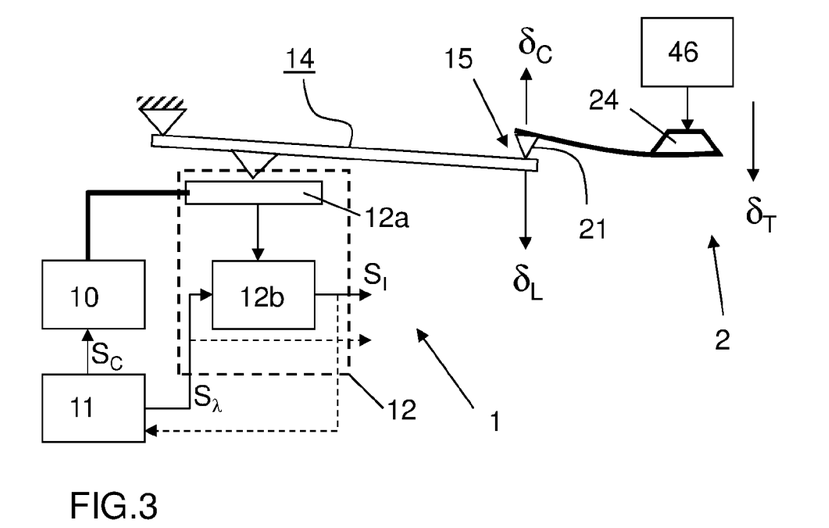
FIG. 3 shows a second embodiment of an arrangement of the first aspect of the invention.

FIG. 3 schematically shows a second embodiment of an arrangement according to the invention. In this embodiment the source of coherent photon radiation has a tunable wavelength and the source 10 is controlled by a wavelength control facility 11 for varying said wavelength over a wavelength range by a control signal $S_C$. The wavelength control facility 11 also provides an output signal $S_\lambda$ indicative for the wavelength to which the source is tuned. This embodiment is preferred as the resonation wavelength is linearly dependent of the strain in the sensor and therewith also linear dependent with the force exerted by the probe to be calibrated.

In an embodiment the wavelength control facility 11 causes the source of coherent photon radiation to vary the wavelength $\lambda_S$ over a wavelength range and the read-out 12b is arranged to determine the wavelength $\lambda_S$ for which the measured intensity I is optimal, i.e. the resonation wavelength $\lambda_{res}$ being indicative for the amount of strain sensed in the optically based strain sensor 12a of sense unit 12. As indicated by dashed lines, the wavelength control facility 11 may receive the signal $S_I$ indicative for the observed intensity as a feedback signal. In that embodiment the wavelength control facility may be arranged to control the wavelength $\lambda_S$ at a value equal to the resonation wavelength $\lambda_{res}$.

Figure 4:
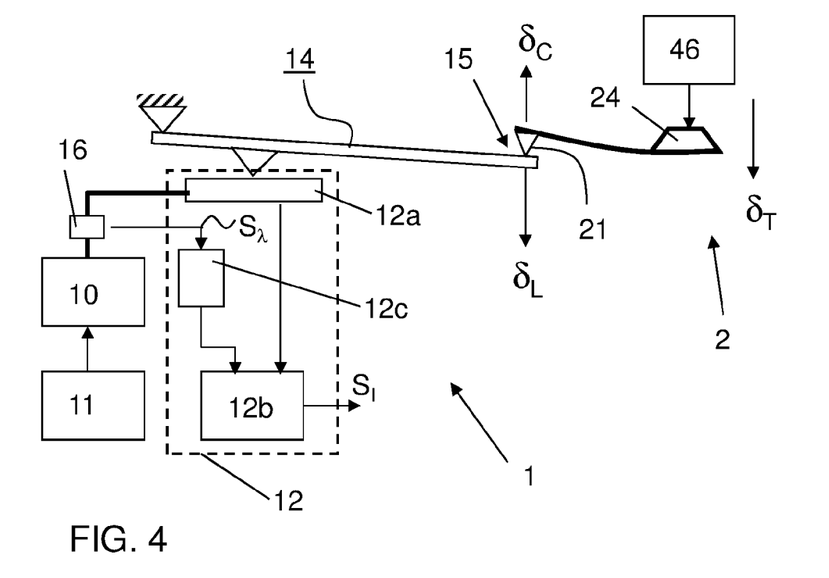
FIG. 4 shows a third embodiment of an arrangement of the first aspect of the invention.

FIG. 4 schematically shows a fourth embodiment. The arrangement in this embodiment further comprises a wavelength tracking unit 12c having an input coupled to the source of coherent photon radiation 10. The wavelength tracking unit 12c is arranged for generating an output signal $S_\lambda$ indicative for the sensed wavelength $\lambda_S$. In this case the wavelength tracking unit 12c and the optically based strain sensor 12a of the sense unit are coupled to the source 10 via a splitter 16.

Figures 5, 5B:
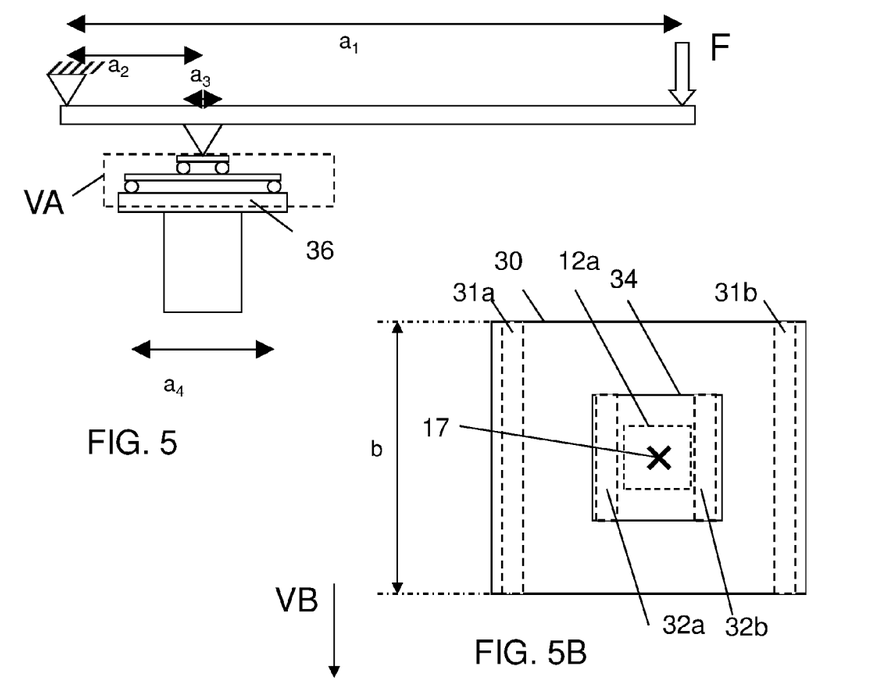
Figure 5A:
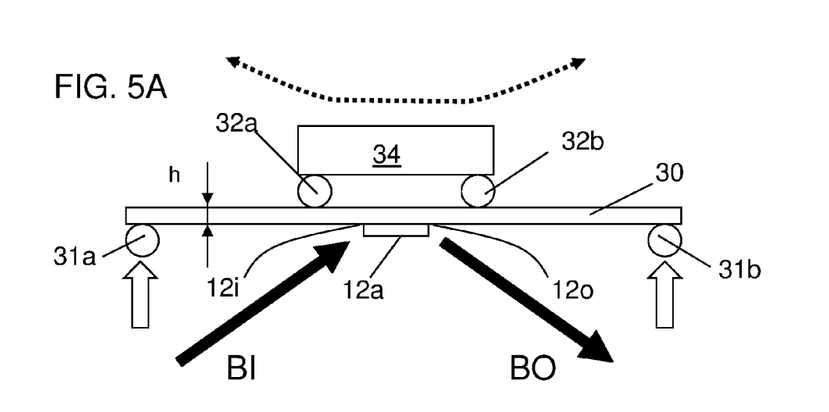
FIG. 5A is an enlarged view according to VA in FIG. 5.

FIG. 5 shows part of a particular arrangement according to the present invention in more detail. FIG. 5A provides a further detailed view according to VA in FIG. 5. FIG. 5B is a top-view according to VB in FIG. 5A. Hidden surfaces are shown therein as dashed lines. In the embodiment shown in FIGS. 5, 5A and 5B the optically based strain sensor 12a is an integrated nanophotonic sensor, comprising a ring resonator or other sensitive device mounted on a substrate 30. The optically based strain sensor 12a receives an input beam BI at input 12i from the source of coherent photon radiation 10 and provides an output beam BO at output 12o. The substrate 30 has first support locations 31a, 31b at a first main side and second support locations 32a, 32b at a second main side opposite the first main side. A distribution plate 34 is provided. The calibration lever has its contact point 17 at the distribution plate 34, which rests at the second support locations 32a, 32b of the substrate. The substrate 30 on its turn is supported by a support 36 at the first support locations 31a, 31b of the substrate. The second support locations 32a, 32b are arranged between the first support locations 31a, 31b. In the embodiment shown the support locations are provided by rods. In an alternative configuration the optically based strain sensor 12a is mounted on the second main side of the substrate 30, i.e. the same side carrying the distribution plate 34. In other alternative embodiments, the arrangement of the first support locations and the second support locations is inversed, i.e. the first support locations are arranged between the second support locations. In that case a larger support plate is necessary.

In the embodiment shown in FIGS. 5, 5A, 5B, the strain $\epsilon_s$ in the optically based strain sensor 12a is related to the force F applied by the cantilever of the probe by the following relation:

$$\varepsilon = \frac{6a_1(a_4 - a_3)}{4a_2 E b h^2} F$$

Therein:
a1 is the distance between the application point of the cantilever tip and the hinge point of the calibration lever.
a2 is the distance between the predetermined application point at the pressure sensitive device and the hinge point of the calibration lever.
a3 is the distance between the second support locations at both sides of the optically based strain sensor 12a.
a4 is the distance between the first support locations.
b is the width of the (substrate of the) integrated nano photonic sensor.

h is the height of the (substrate of the) integrated nano photonic sensor.

E is Youngs Modulus of the (substrate of the) nano photonic sensor.

Figure 6:
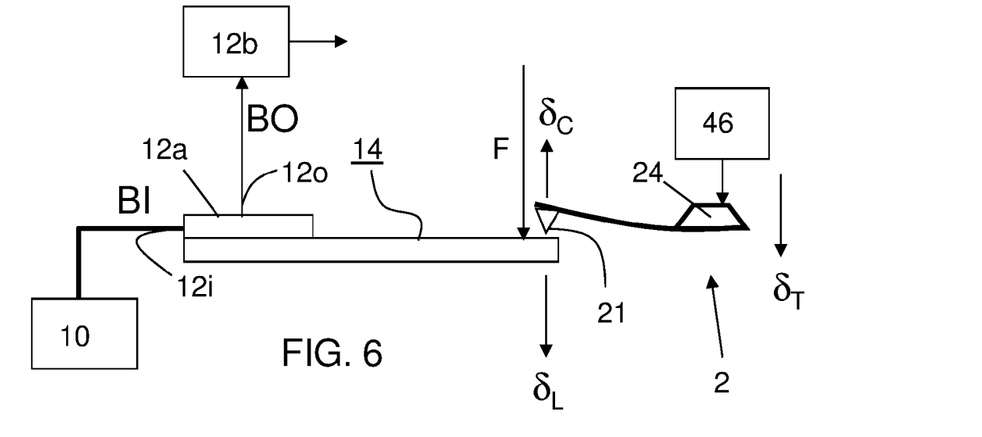
FIG. 6 shows a first alternative embodiment of an arrangement according to the first aspect of the invention.

FIG. 6 shows a first alternative embodiment, wherein the at least one calibration lever is mechanically coupled to the optically based strain sensor for converting a force F into an amount of strain in the optically based strain sensor, in that the optically based strain sensor 12a is arranged in a longitudinal direction along a surface of the calibration lever. Exertion of a force F on the cantilever 14 causes the cantilever and the optically based strain sensor to flex, resulting in a strain in the optically based strain sensor proportional to the force F. The optically based strain sensor 12a is coupled at input 12i to the source 10 of coherent radiation and has an output 12o coupled to interrogator 12b. The interrogator 12b determines as resonation wavelength of the optically based strain sensor 12a, which is a linear function of the strain in the sensor 12a.

Figure 7:
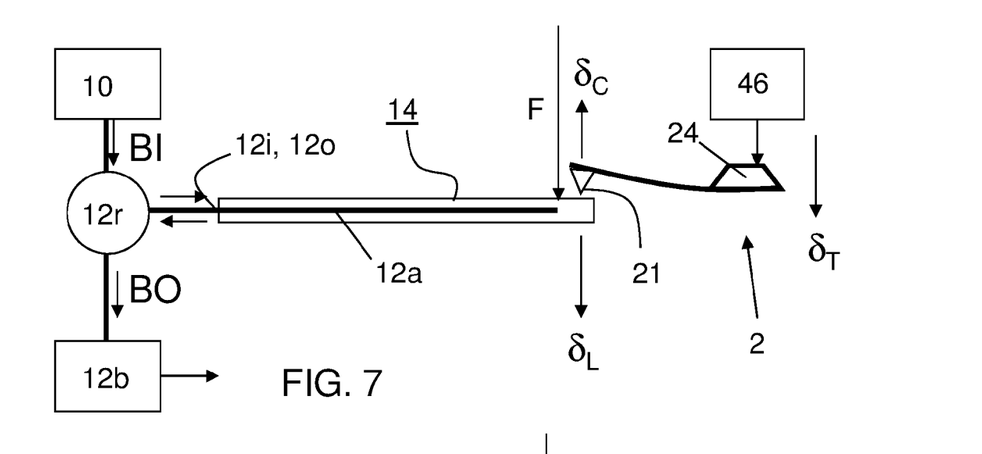
FIG. 7 shows a second alternative embodiment of an arrangement according to the first aspect of the invention.

FIG. 7 shows a second alternative embodiment, wherein the at least one calibration lever is mechanically coupled to the optically based strain sensor for converting a force F into an amount of strain in the optically based strain sensor, in that the optically based strain sensor 12a is a fiber Bragg grating (FBG) that is integrated in a longitudinal direction within the calibration lever. The fiber Bragg Grating is optically coupled to the source 10 of coherent radiation by an optical redirection element 12r. Exertion of a force F on the cantilever 14 causes the cantilever and the optically based strain sensor to flex, resulting in a strain in the optically based strain sensor proportional to the force F. Optical radiation having a wavelength corresponding to the resonance wavelength of the FBG, which is proportional to the strain an the force F is reflected in the FBG and redirected by the optical redirection element 12r to an output coupled with the interrogator 12b.

Figure 8:
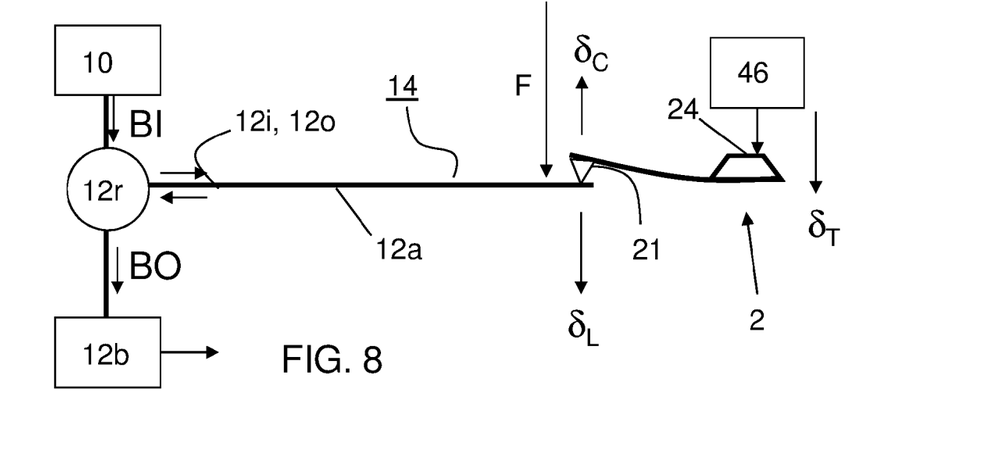
FIG. 8 shows a third alternative embodiment of an arrangement according to the first aspect of the invention, FIG. 9 partly shows an embodiment of an arrangement according to the third aspect of the invention, FIG. 10 schematically illustrates a calibration method according to a fourth aspect of the invention.

FIG. 8 shows a third alternative embodiment, wherein the at least one calibration lever is mechanically coupled to the optically based strain sensor for converting a force F into an amount of strain in the optically based strain sensor, in that the optically based strain sensor 12a is a fiber Bragg grating, and that said fiber Bragg grating forms the calibration lever. The fiber Bragg Grating is optically coupled to the source 10 of coherent radiation by an optical redirection element 12r. Exertion of a force F on the fiber Bragg grating 14 causes it to flex, resulting in a strain therein proportional to the force F. Optical radiation having a wavelength corresponding to the resonance wavelength of the FBG, which is proportional to the strain an the force F is reflected in the FBG and redirected by the optical redirection element 12r to an output coupled with the interrogator 12b.

The arrangement described with reference to FIGS. 1 to 8 may be used as a stand-alone device, but may alternatively be provided as part of an AFM microscope or other instrument using a force sensing probe.

Figure 9:
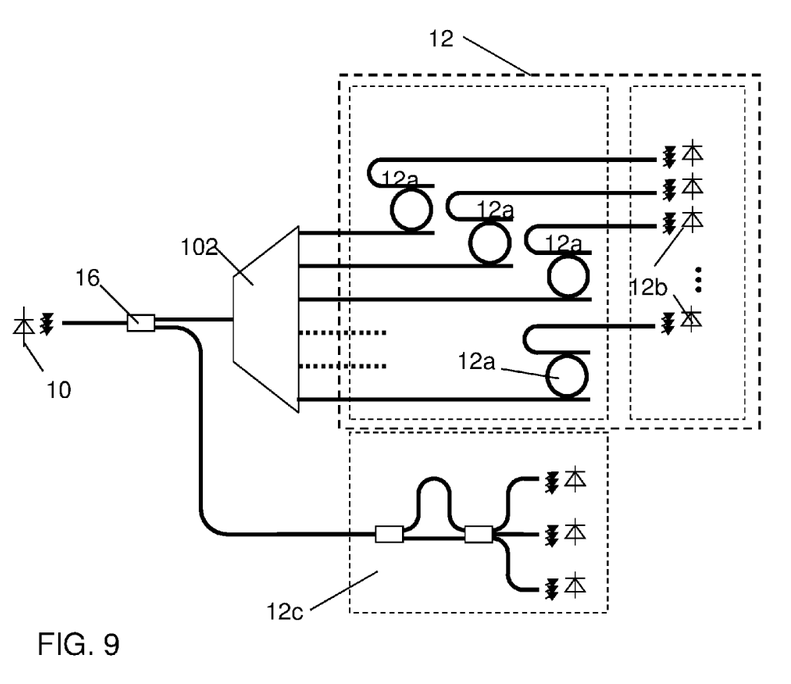

FIG. 9 shows part of a further arrangement according to the present invention that is suitable for calibration of a batch of probes. In the embodiment of FIG. 8, the sense unit 12 comprises a plurality of optically based strain sensors 12a and a plurality of calibration levers (not shown). During calibration the probes of the batch each have their tip placed upon a corresponding one of the calibration levers. The calibration levers each are mechanically coupled to a corresponding one of the optically based strain sensors 12a, so as to convert a force exerted by a tip 21 into an amount of strain in the optically based strain sensor 12a. The arrangement further comprises an optical demultiplexer 102 having an input coupled to the source 10 of coherent photon radiation and a plurality of outputs. Each of the plurality of optically based strain sensors is coupled to the source of coherent photon radiation via one of the plurality of outputs of the optical demultiplexer. In this way a single coherent photon radiation source 10 suffices in this arrangement. In this embodiment the arrangement has a wavelength tracking unit 12c having an input coupled to the source of coherent photon radiation. The wavelength tracking unit is arranged for generating an output signal indicative for the wavelength. In the embodiment shown the wavelength tracking unit 12c is coupled via a separate splitter 16 to the coherent photon radiation source 10. Alternatively, the wavelength tracking unit 12c is coupled to one of the outputs of the optical demultiplexer 102.

In the embodiment shown each of the optically based strain sensors 12a has a corresponding opto-electric conversion unit 12b. In an alternative embodiment the optically based strain sensors 12a share a common opto-electric conversion unit 12b that sequentially converts the optical signals rendered by the optical based strain sensors 12a. The common opto-electric conversion unit 12b is for example coupled to the optically based strain sensors 12a via an optical multiplexer that periodically selects one of the sensors 12a according to a sequence.

Next a calibration method is disclosed with reference to FIGS. 10 to 14. The calibration method is applicable both for calibration of a single probe as for calibration of a batch of probes. For clarity the method will be described in detail for calibration of a single probe.

The calibration method includes a first calibration stage for calibrating the calibration device and a second calibration stage for calibrating the probe. The first calibration stage need only be carried out once for the calibration apparatus. Once this calibration stage is completed the apparatus may be used to calibrate a plurality of probes.

Figures 10, 10A:
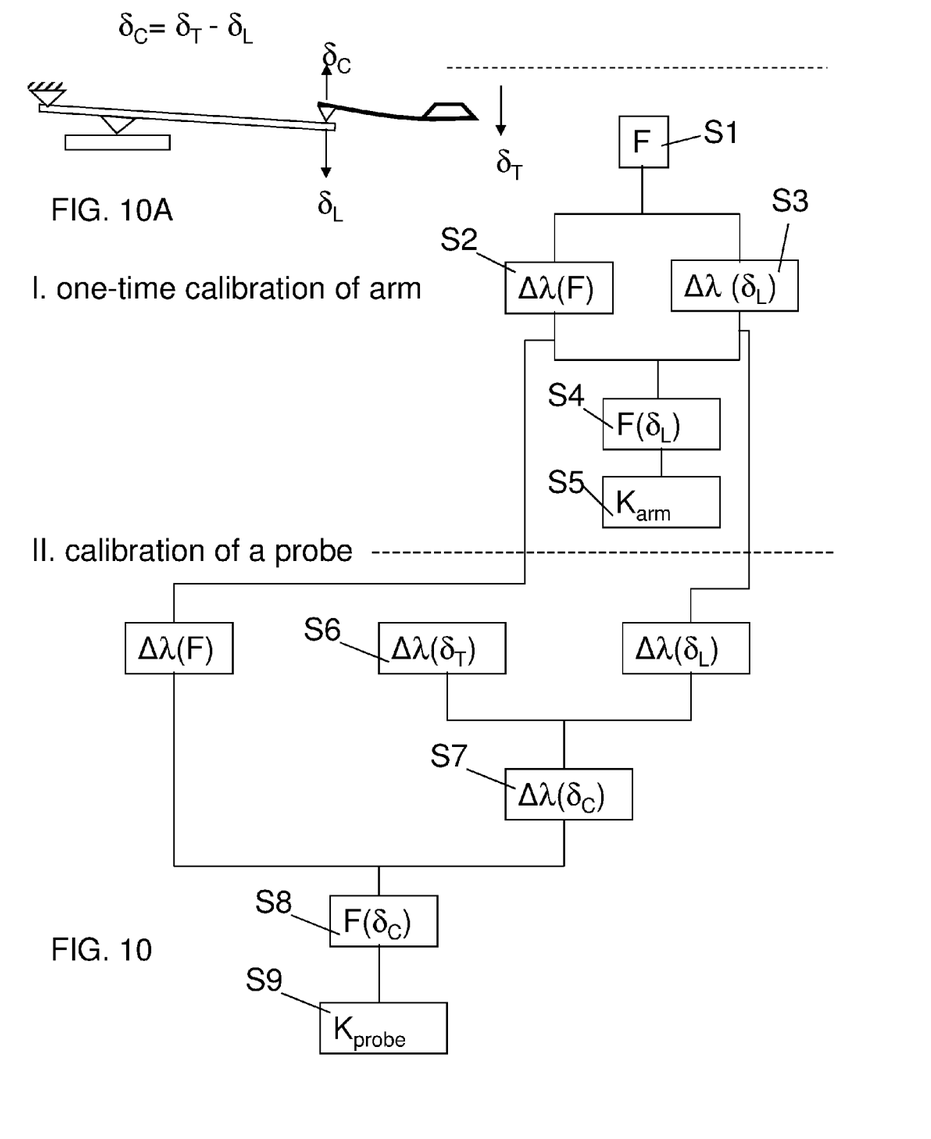

In the first stage of calibration, in step S1, a known force F is applied at a known position of the calibration lever 12. The force may be varied step-wise or continuously. The variable force F is applied at the arm, for example by applying normalized weights or by applying electrostatic forces, magnetic forces or other controllable forces, depending on the dimensions of the calibration apparatus.

Figure 11A:
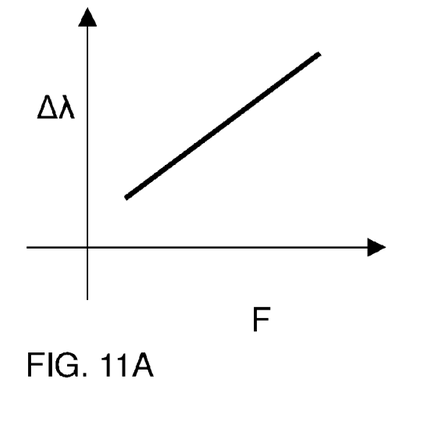
Figure 11B:
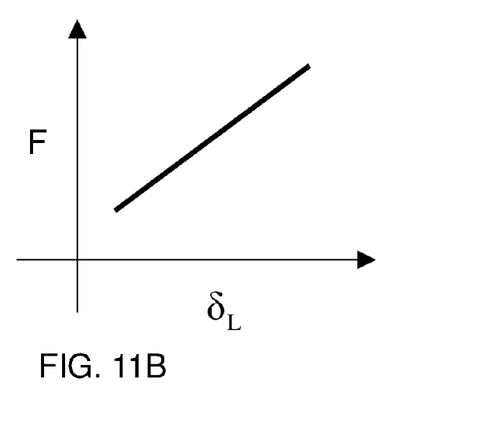
FIG. 11B illustrates another step of the method.
Figure 11C:
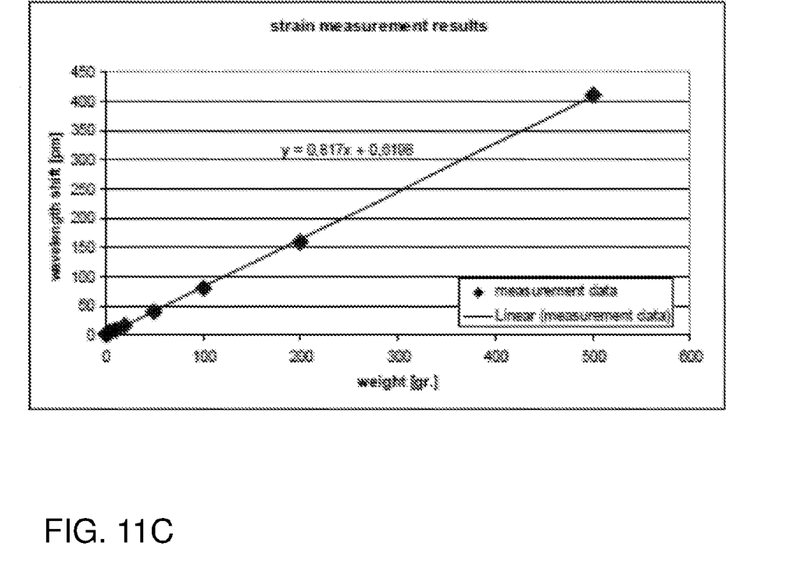

In steps S2 and S3, both the wavelength shift $\Delta\lambda$ and the deflection $\delta L$ at the location where the force F is applied, are measured. This results in the relations $\Delta\lambda(F)$ as shown in FIGS. 11A and 11C and $\Delta\lambda(\delta L)$ as shown in FIG. 11B. The vertical displacement $\delta_L$ may be determined as the displacement $\delta_T$ by an actuator that maintains the tip of the probe in contact with the calibration lever without deflecting the probe. Other means for measuring the displacement $\delta_L$, such as interferometry are suitable too. The relations $\Delta\lambda(\delta_L)$ and $\Delta\lambda(F)$ need only be determined once, and are reused in the second part of the procedure for calibration of the probes. Optionally the relation $F(\delta_L)$ and therewith the spring constant $K_{arm}$ can be derived in steps S4, S5.

Figure 12A:
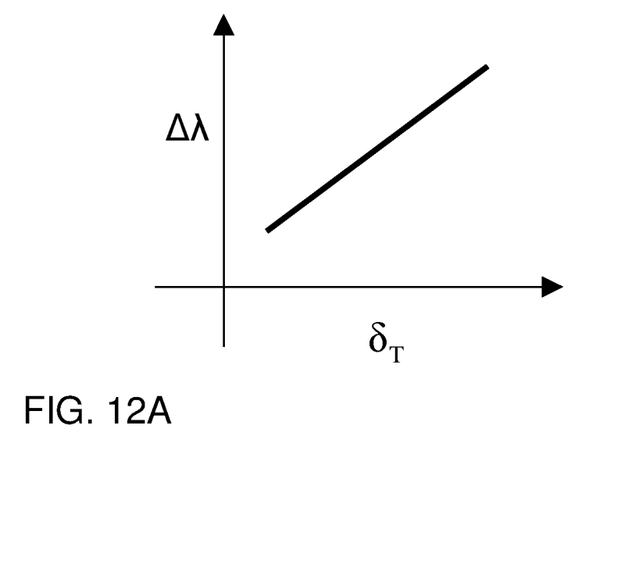
FIG. 12A illustrates again another step of the method.

In order to calibrate a probe, in step S6 the wavelength shift $\Delta\lambda$ is measured as a function of an imposed displacement $\delta_T$ of the probe by an actuator. Step S6 is also illustrated in FIG. 12A. When vertically displacing the base of the probe with a displacement $\delta_T$ a force F is exerted on the calibration arm that causes a deflection $\delta_L$ of the calibration arm and results in a wavelength shift $\Delta\lambda$. In step S7 the relation between the wavelength shift $\Delta\lambda$ and the deflection of the cantilever of the probe is determined. From the one-time calibration the wavelength shift $\Delta\lambda(\delta_L)$ is known and therewith also $\delta_L$ is known for the position L where the force F was applied during calibration.

Figure 12B:
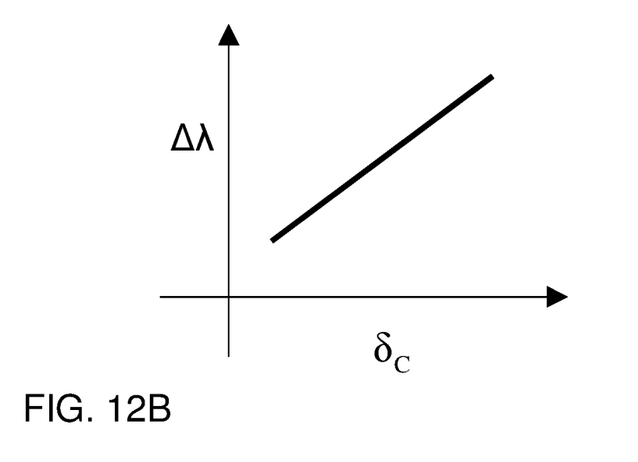
FIG. 12B illustrates a further step of the method.
Figure 13:
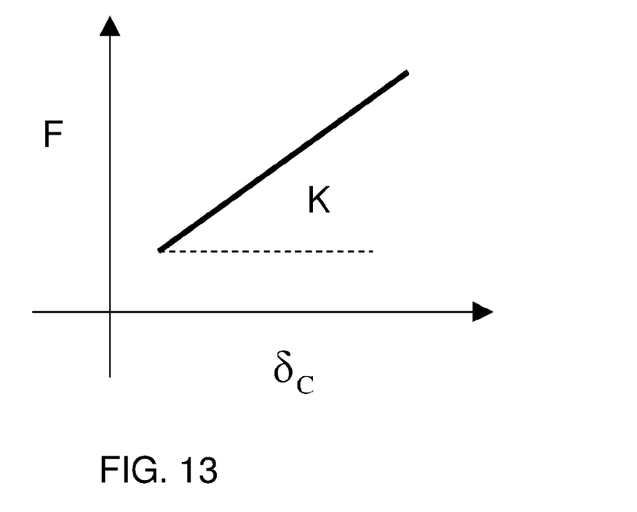
FIG. 13 illustrates a still further step of the method.

If the position where the tip of the probe contacts the arm is known with sufficient precision, then also the force F can be derived from the relation obtained in step S2. Also the deflection $\delta_C$ can be determined either from the difference $\delta_C = \delta_T - \delta_L$ or from direct measurement of the deflection $\delta_C$. Therewith the relation $\Delta\lambda$ ($\delta_C$) is obtained as shown in FIG. 12B. Also the relation $F(\delta_C)$ shown in FIG. 13, can be obtained from the relation obtained in steps S2 and S7. The spring constant $K_{probe}$ of the probe's cantilever is the slope of the function $F(\delta_C)$.

In some situations the position where the tip of the probe contacts the arm may be not known with sufficient precision. In this case the position can be determined by a differential measurement as illustrated in FIGS. 14A and 14B. Therein the deflection of the calibration lever is measured at two positions L and L+ΔL with the condition that the strain E measured by the INP is equal. This implies that Δλ is maintained at a constant value. This is based on the insight that even if the exact position L of the tip on the arm can not be measured directly, the displacement ΔL of the probe can in practice be measured very precise, e.g. with a built in displacement sensor of an instrument, such as an AFM-microscope. This can be seen as follows.

Figure 14:
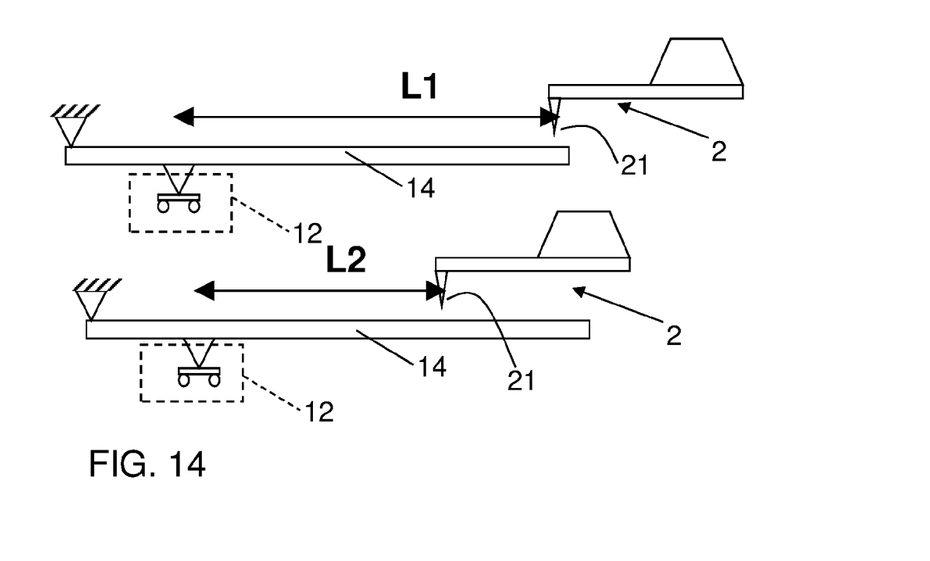
FIG. 14 illustrates a still further step of the method, FIG. 15 schematically shows an atomic force microscope according to the third aspect of the invention.

The strain $\epsilon_L$ in the calibration lever 14 at the location where it is mechanically coupled to the sensor 12a is $$\varepsilon_l = \frac{3t}{2L^2}\delta$$

Therein
t: thickness of calibration lever (arm)
L: the distance between its anchor point 18 and the point where the force is exerted by the tip of the probe
δ: deflection of the arm at said distance L from the anchor point Accordingly, in case of a second measurement at a location ΔL from this position, while maintaining the strain at the same value, a deflection δ' is measured, wherein.

$$\varepsilon_l = \frac{3t}{2(L+\Delta L)^2}\delta'$$

Figure 15:
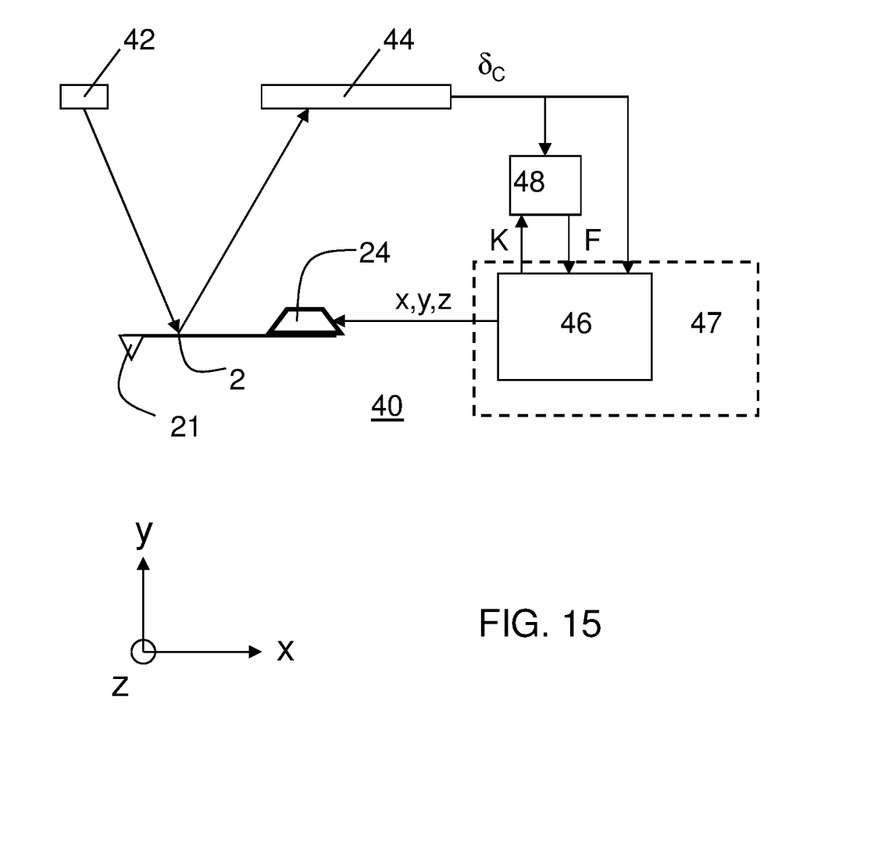

FIG. 15 shows an embodiment of an atomic force microscope having integrated therein an arrangement for calibrating AFM probes. The microscope 40 is provided with a calibration arrangement according to the first aspect of the invention, for example as described with reference to FIGS. 1 to 5. The microscope includes a probe holder 24 having a controllable position for holding an AFM probe 2. The microscope further includes a deflection sensor for sensing a deflection ($\delta_C$) of the tip of the probe relative to a fixed end of the probe, hold by the probe holder. In the embodiment shown, the deflection sensor includes a radiation source 42 for radiating a beam of photon radiation at the probe and an optical sensor 44 for sensing the reflected beam. However alternative implementations for the deflection sensor are possible, for example based on interferometry. The microscope 40 further has a calculation facility 48 for calculating a force F exerted by the tip 21 of the probe on the basis of the sensed deflection. The force F is calculated from the product of the deflection and the spring constant K of the probe. The microscope 40 is further provided with an AFM controller 47 for controlling a position of the probe holder 24. The AFM controller 47 includes a calibration control facility 46. The AFM-controller 47 has a first calibration mode, wherein the calibration control facility 46 performs a calibration procedure to determine the spring constant K of the probe. The value K so obtained is then provided to calculation facility 48. During a second normal operational mode, the AFM controller controls the probe holder 24 in a manner known as such to perform force measurements using the value K for the spring constant obtained during the calibration mode.

In an embodiment the AFM controller is arranged to move the probe holder in a z-direction, from a first z-position to a second z-position. Therein the first z-position is assumed during the calibration mode and the second z-position is assumed during the normal operation mode. The first z-position corresponds to the z-position of the calibration lever and the second z-position corresponds to the position of an object to be investigated. Alternatively, the probe holder may be kept at a fixed position while the position of the calibration lever and of the object to be investigated are changed between the calibration mode and the normal operational mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Control functions may be carried out by dedicated hardware (ASICs), by a suitably programmed general purpose processor or by a combination thereof. Various control functions may be realized by a common component. For example the calibration apparatus may have a single controller that both serves as a wavelength control facility, a calibration control facility and that may further be arranged to carry out calculations involved in the calibration process.

The invention claimed is:
1. An arrangement for calibrating probes comprising a tip, the arrangement comprising
at least one calibration lever (14) having a surface for placement of a tip (21) of a probe (2) to be calibrated,
at least one probe holder (24) for holding the probe (2) to be calibrated, the at least one probe holder having a controllable position in at least a direction (y) transverse to the surface of the calibration lever (14),
a calibration control facility (46) for controlling said controllable position within a range of position values, and for determining a mechanical property of said probe from a deflection ($\delta_C$) of the tip (21) of the probe relative to the probe holder as a function of said position and from a second parameter, characterized in that the arrangement further comprises at least one optically based strain sensor (12a) optically coupled to a source of coherent photon radiation for measuring an amount of strain ($\epsilon$), the calibration lever being mechanically coupled to the at least one optically based strain sensor for converting a force (F) exerted by said tip at said surface into an amount of strain in the optically based strain sensor, and wherein the second parameter for determining a mechanical property of said probe is the measured amount of strain ($\epsilon$).

2. The arrangement according to claim 1, wherein the source of coherent photon radiation (10) has a tunable wavelength, and wherein the arrangement further comprises a wavelength control facility (11) for varying said wavelength over a wavelength range.

3. The arrangement according to claim 2, wherein the wavelength control facility (11) provides an output signal ($S_\lambda$) indicative for the wavelength of the radiation provided by the source (10).

4. The arrangement according to claim 2, further comprising a wavelength tracking unit (12c) having an input coupled to the source of coherent photon radiation, the wavelength tracking unit being arranged for generating an output signal ($S_\lambda$) indicative for the wavelength of the radiation provided by the source (10).

5. The arrangement according to claim 1, wherein the optically based strain sensor (12a) is mounted on a substrate (30), the substrate having first support locations (31a, 31b) at a first main side and second support locations (32a, 32b) at a second main side opposite the first main side, the substrate being supported by a support (36) at the first support locations of the substrate, wherein the optically based strain sensor has its application point (17) at the distribution plate (34) which rests at the second support locations of the substrate, wherein the second support locations are arranged between the first support locations or the first support locations are arranged between the second support locations.

6. The arrangement according to claim 1, wherein the at least one calibration lever (14) is mechanically coupled to the optically based strain sensor (12a) for converting a force (F) into an amount of strain in the optically based strain sensor, in that the optically based strain sensor (12a) is arranged in a longitudinal direction along said surface of the calibration lever.

7. The arrangement according to claim 1, wherein the at least one calibration lever (14) is mechanically coupled to the optically based strain sensor (12a) for converting a force (F) into an amount of strain in the optically based strain sensor, in that the optically based strain sensor 12a is integrated in a longitudinal direction within the calibration lever.

8. The arrangement according to claim 1, wherein the at least one calibration lever (14) is mechanically coupled to the optically based strain sensor (12a) for converting a force (F) into an amount of strain in the optically based strain sensor, in that the optically based strain sensor (12a) is a fiber Bragg grating, and that said fiber Bragg grating forms the calibration lever.

9. The arrangement according to claim 1, wherein the position of said at least one probe holder (24) is further controllable in a direction (x) corresponding to a longitudinal direction of the calibration lever (14), and wherein the calibration control facility (46) is further arranged for setting the position of the probe into at least two mutually different positions in said direction, and for determining a deflection ($\delta_C$) of the tip (21) of the probe at said at least two mutually different positions, while controlling the position ($\delta_T$) of the probe to maintain the observed strain ($\epsilon$) at a same value in said two positions.

10. The arrangement according to claim 1, wherein the at least one optically based strain sensor (12a) is one of a plurality of optically based strain sensors, and wherein the at least one calibration lever (14) is one of a plurality of calibration levers, each calibration lever being mechanically coupled to a respective one of said plurality of optically based strain sensors as specified in claim 1, the arrangement further comprising an optical splitter (102) having an input coupled to the source (10) of coherent photon radiation and a plurality of outputs, wherein each of said plurality of optically based strain sensors (12a) is coupled to the source of coherent photon radiation via a respective one of the plurality of outputs of the optical splitter.

11. The arrangement according to claim 10, comprising a common opto-electric conversion unit (12b) that sequentially converts the optical signals rendered by the optical based strain sensors (12a).

12. Atomic force microscope (40) provided with an arrangement according to claim 1, the microscope including a probe holder (24) having a controllable position for holding an AFM probe (2), a deflection sensor (42, 44) for sensing a deflection ($\delta_C$) of the probe, a facility (48) for calculating a force (F) on the basis of the sensed deflection and an AFM controller (47) for controlling a position of the probe holder, the AFM-controller (47) having a first, calibration mode, and a second, normal operational mode.

13. Method for calibrating probes comprising a tip, the method comprising the steps of
a. generating coherent photon radiation,
b. providing at least one optically based strain sensor for measuring an amount of strain,
c. optically coupling said at least one optically based strain sensor to said source of coherent photon radiation,
d. providing at least one calibration lever having a surface for placement of a tip (21) of a probe (2) to be calibrated,
e. mechanically coupling the at least one calibration lever to the at least one optically based strain sensor,
f. varying a position ($\delta_T$) of the probe at an end remote from the tip in a direction transverse to said surface, the tip of the probe therewith exerting a variable force (F) to said surface, said force (F) being converted into an amount of strain in the optically based strain sensor by said mechanical coupling,
g. measuring said force by the conversion thereof into a strain, causing said strain to modulate a property of said generated coherent photon radiation with said optically based strain sensor and determining the strain from said modulation in said property,
h. determining a mechanical property of said probe from the determined amount of strain (E) and a deflection ($\delta_C$) of the tip (21) of the probe relative to said remote end as a function of said position in the transverse direction.

14. Method for calibrating probes according to claim 13, comprising the additional steps preceding the steps b to e,
applying a force having a predetermined variable value at said surface (S1),
determining a relation between the force so applied and the amount of strain caused therewith (S2),
determining a relation between the amount of strain caused and a deflection at the calibration lever at a position where said force is applied (S3).

15. Method for calibrating an probes according to claim 13, further comprising the step of performing at least one calibration measurement in each of at least two mutually different positions in a longitudinal direction of the calibration lever, said calibration measurement involving determining a deflection ($\delta_C$) of the tip (21) of the probe at said at least two mutually different positions, while controlling the position ($\delta_T$) of the probe in the transverse direction to maintain the observed strain ($\epsilon$) the at same value in said two positions.

16. Method for calibrating an probes according to claim 14, further comprising the step of performing at least one calibration measurement in each of at least two mutually different positions in a longitudinal direction of the calibration lever, said calibration measurement involving determining a deflection ($\delta_C$) of the tip (21) of the probe at said at least two mutually different positions, while controlling the position ($\delta_T$) of the probe in the transverse direction to maintain the observed strain ($\epsilon$) the at same value in said two positions.

\* \* \* \* \*